United States Patent [19]

Henmi et al.

[11] Patent Number: 5,347,442
[45] Date of Patent: Sep. 13, 1994

[54] ELECTRIC POWER SUPPLY SYSTEM FOR ELECTRIC TRAIN WHICH REMOVES FLICKERING IN LIGHTING

[75] Inventors: Takuma Henmi; Susumu Yamada, both of Tokyo, Japan

[73] Assignee: Kabushiki Kaisha Toshiba, Tokyo, Japan

[21] Appl. No.: 879,913

[22] Filed: May 8, 1992

[30] Foreign Application Priority Data

May 13, 1991 [JP] Japan .................................. 3-107566

[51] Int. Cl.⁵ ........................................... H02M 7/42
[52] U.S. Cl. ...................................... 363/41; 363/79; 363/95
[58] Field of Search ...................... 363/39, 40, 41, 43, 363/55, 15, 16, 78, 79, 131

[56] References Cited

U.S. PATENT DOCUMENTS

| | | | |
|---|---|---|---|
| 3,859,590 | 1/1975 | Cielo et al. | 363/39 |
| 4,504,897 | 3/1985 | Blackwood | 363/39 |
| 5,001,619 | 3/1991 | Nakajima et al. | 363/41 |
| 5,115,386 | 5/1992 | Shirahama et al. | 363/41 |

Primary Examiner—Steven L. Stephan
Assistant Examiner—Adolf Berhane
Attorney, Agent, or Firm—Oblon, Spivak, McClelland, Maier & Neustadt

[57] ABSTRACT

An electric power supply system used in electric trains or electric buses is equipped with a device for removing ripples of low frequencies which cause flickering in a lighting system on the train or bus. The system includes an inverter for inverting DC power to AC power, a low pass filter for passing components of the AC power having low frequencies, amplitude detecting means for detecting an amplitude of an output of the filter, error detecting means for detecting any deviation of the amplitude from a reference signal, and a control system for detecting and removing flickering components from an error signal generated by the error detecting means. The control system includes a flickering component passing device for passing only flickering components contained in an output of the filter, a phase compensating device for compensating a phase lag of the flickering components, and a gain compensating device for compensating a gain of the flickering components.

5 Claims, 6 Drawing Sheets

ELECTRIC POWER SUPPLY SYSTEM FOR ELECTRIC TRAIN WHICH REMOVES FLICKERING IN LIGHTING

BACKGROUND OF THE INVENTION

1. Field of the Invention

The present invention relates to an electric power supply system used in electric trains or electric buses, and particularly to an electric power supply system with an inverter system comprising a control system to remove ripples of low frequencies which cause flickers in lighting.

2. Description of the Related Art

Conventional electric trains use alternating current (AC) for electric devices such as lighting systems and air conditioners, and have an inverter system which changes direct current (DC) to AC. A conventional inverter system is shown in FIG. 1.

In the figure, DC power is supplied to the inverter system 11 through a pantograph unit 15 from a trolly wire 13. The DC power is inverted into AC power and is supplied to loads 19 such as an air compressor 19a, a lighting device 19b and an air conditioner 19c of the locomotive.

An output voltage of the AC power supply system is fluctuated by various causes, for example, by a torque change in its driving motor, influence from another train which runs on the same wire span, a load change of electric devices used in the train, or a change of the state in which the pantograph contacts the wires.

To remove the fluctuation of the output voltage, the conventional inverter system has a control system 11 as shown in FIG. 1. The control system 11 comprises an inverter 17 for inverting DC current into AC current; a low frequency passing filter 20 for removing high frequency noise caused by the switching of the inverter; an amplitude detector 21 for detecting an output voltage of the inverter; a reference voltage setting device 23; an error detector 25 for detecting errors as deviations from a voltage; a controller 27 for generating a control value M; and a pulse width modulator (PWM) 29 for changing the control value into a pulse signal which controls a switching part of the inverter 17.

The control system regulates the fluctuation caused by the various reasons mentioned above.

However, as the load of the air compressor 19a fluctuates at a low frequency of from several Hz to about 20 Hz and its current flow is great, the fluctuation is not completely removed and it remains in the output voltage as a ripple. This ripple is small compared with the output voltage and it does not cause trouble when using general electric devices. But, ripples of 10 Hz to 20 Hz cause passengers to become aware of flickering lighting even if the ripples are several volts.

The degree of flickering at which a human becomes aware of the flickering depends on the frequency of the ripple and each individual person.

A relationship between the mean degree of flickering and frequencies of the ripple is known as a luminosity curve. Frequencies of a load fluctuation of a mechanical device such as an air compressor are in a range where luminous efficiency is large. Then, when the air compressor begins to work, ripples of several volts are generated in the output voltage, which cause a flicker in the lighting. The flickering of light causes discomfort to the passengers. This problem has been left unsolved.

FIG. 2A shows a waveform of an output of PWM 29 exhibiting pulse width modulation. FIG. 2B shows a fundamental waveform of the output voltage of the inverter. FIG. 2C shows an output signal with a ripple caused by inverter 17. FIG. 2D shows a ripple wave with an amplitude Δv and a period T extracted by error detector 25. FIGS. 2C and 2D have a shortened time scale.

SUMMARY OF THE INVENTION

An electric power supply system of the present invention is used in electric trains or electric buses and is designed to remove ripples of low frequencies which cause flickering in lighting.

The system of the invention comprises an inverter, an amplitude detecting means for a detecting output of the inverter, an error detecting means for detecting a deviation of the detected output from, and a reference voltage control system for removing a flickering component from the output of the inverter. The control system comprises a flickering component selecting device, a phase compensating device for compensating a phase lag expected to be caused by the flickering component selecting device, and a first gain compensating device for compensating a gain of an output of the phase compensating device.

Preferably, the control system further includes a frequency detecting device for detecting the flickering component, a sine wave generator with a frequency identical to that of the flickering component, a multiplying device, and a gain compensating device for compensating a gain of the output of the sign-wave generator depending on the frequency detected by the frequency detecting device.

These and other objects, features and advantages of the present invention will be more apparent from the following description of a preferred embodiment, taken in conjunction with the accompanying drawings.

DETAILED DESCRIPTION OF THE PREFERRED EMBODIMENT

Figure 1:
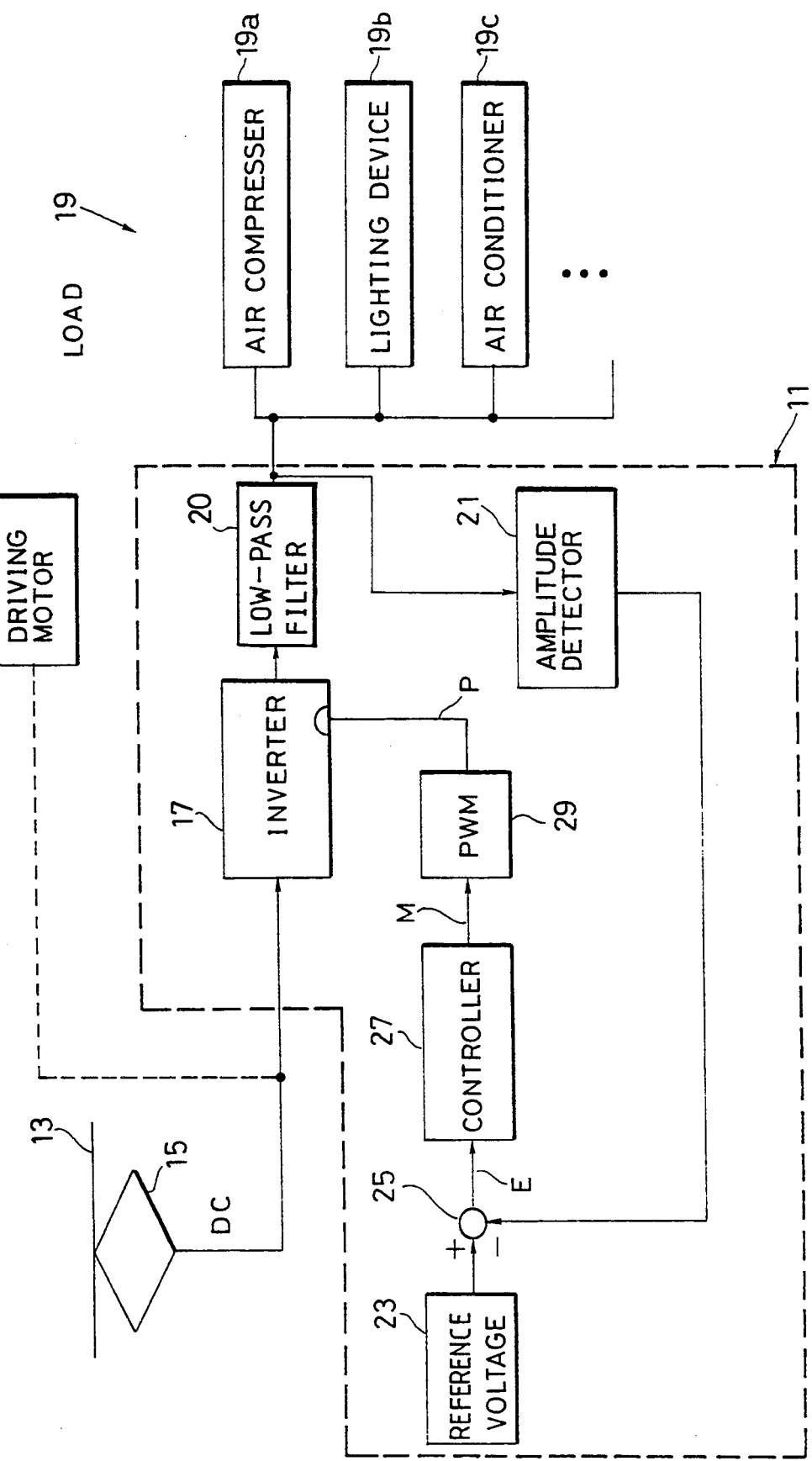
FIG. 1 shows a conventional electric power supply system.
Figure 2A:
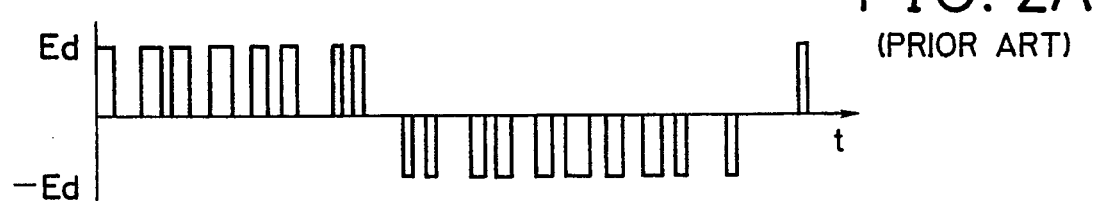
FIG. 2 A–D shows an example of waveforms of the conventional system of FIG. 1.
Figure 2B:
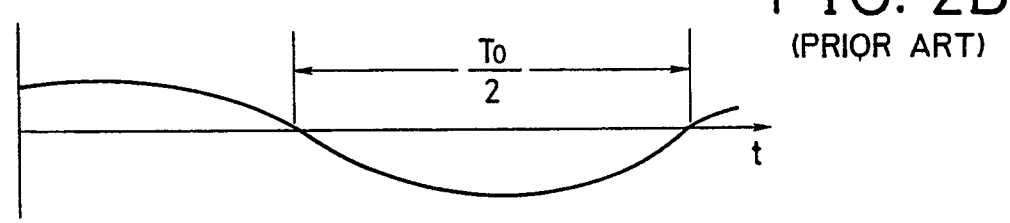
Figure 2C:
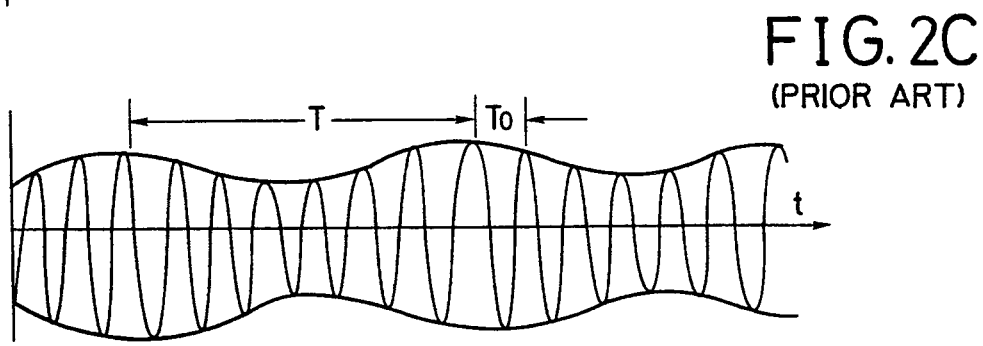
Figure 2D:
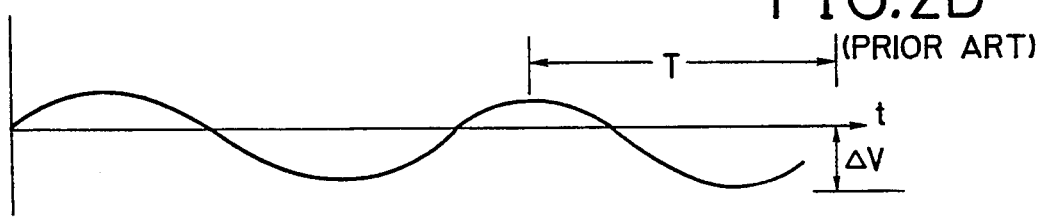
Figure 3:
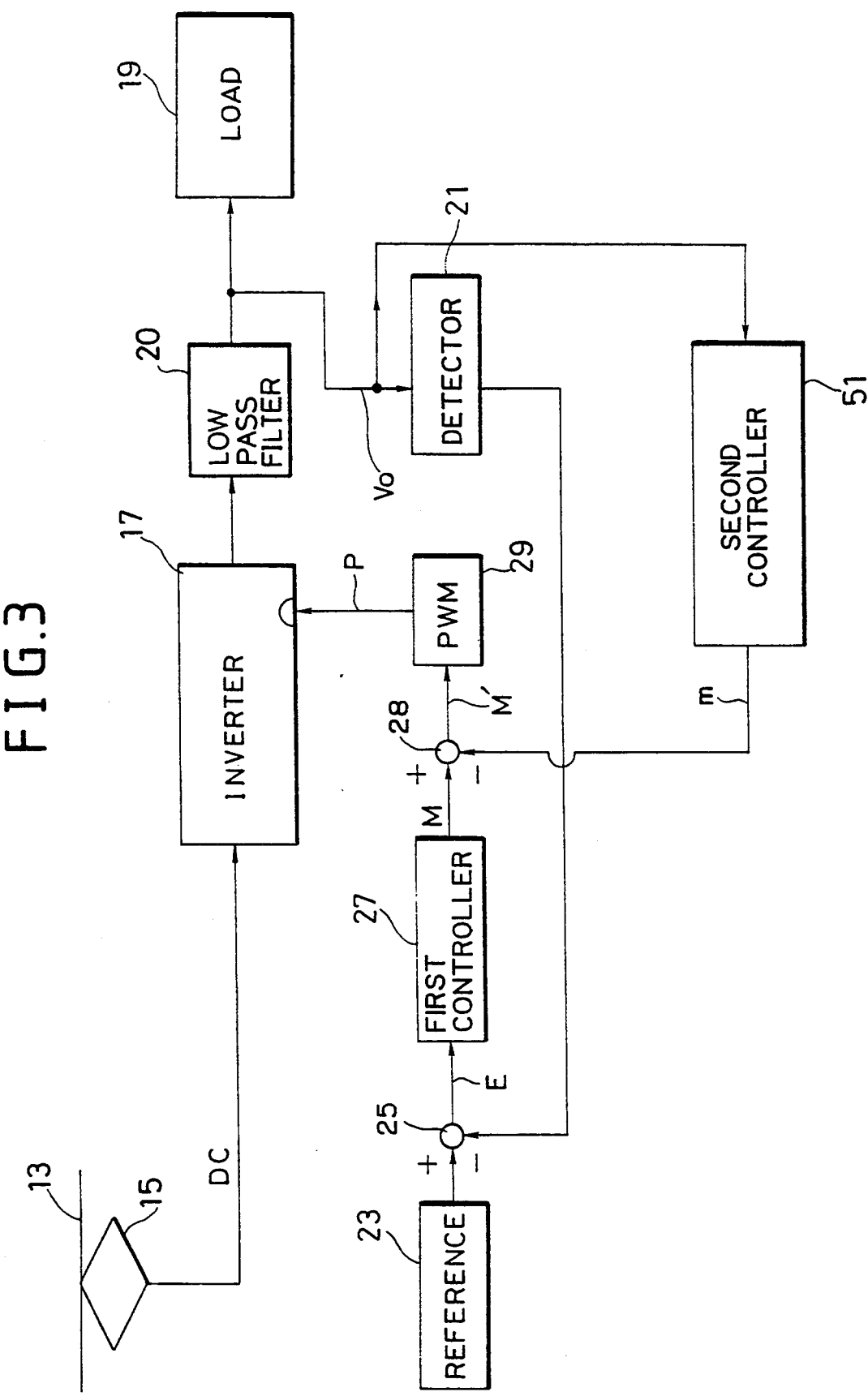
FIG. 3 shows an electrical power supply system of the present invention.

FIG. 3 shows a block diagram of the first embodiment of the invention. The embodiment comprises an inverter 17, a low frequency passing filter 20, an output voltage detector 21, a reference voltage setting device 23, an error detector 25, a first controller 27, a pulse width modulator 29, and a second controlled 51 for removing flickering components from an output of the inverter 17.

A description of the operation of the system is comprised of the above described components, follows.

An output of the inverter 17 is input to the low pass filter 20 in order to remove switching pulses caused by the inverter 17.

The output $V_o$ of the low pass filter is detected by the detector 21, and is compared with a reference voltage generated by the reference voltage setting device 23. An output E from the error detector 25 is converted into a control input M by the first controller 27. Through adder 28, the control input M is used to maintain the output $V_o$ equal to a specified voltage. The output m of the second controller 51 which is used to remove flickering components from the output $V_o$ is subtracted from the control input M. The subtracted control input Ml(=M−m) is transformed into a pulse train P, which regulates a switching part of the inverter 17. In the above mentioned system, two feedback systems work together to maintain the output $V_o$ constant and remove ripples which cause flickering in lighting. The second controller 51 is detailed as follows.

Figure 4:
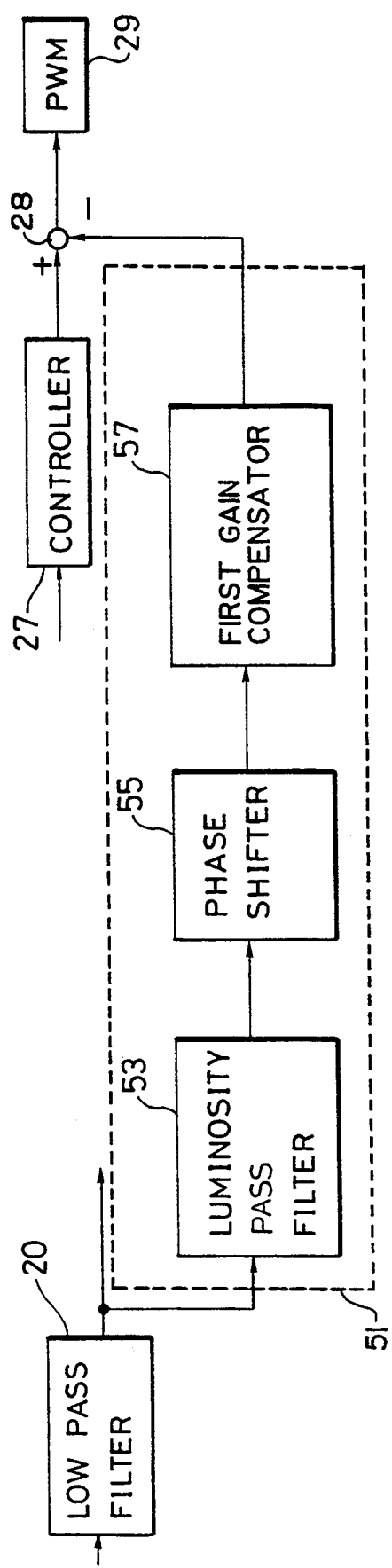
FIG. 4 shows a block diagram of a second controller of a first embodiment of the invention.

FIG. 4 shows a simplified block diagram of the second controller 51.

The second controller 51 comprises a luminosity pass filter 53 for passing flickering components of the output of the low-pass filter 20, a phase shifter 55 for compensating a phase lag caused by the luminosity pass filter 53, and a first gain compensator 57.

Figure 5:
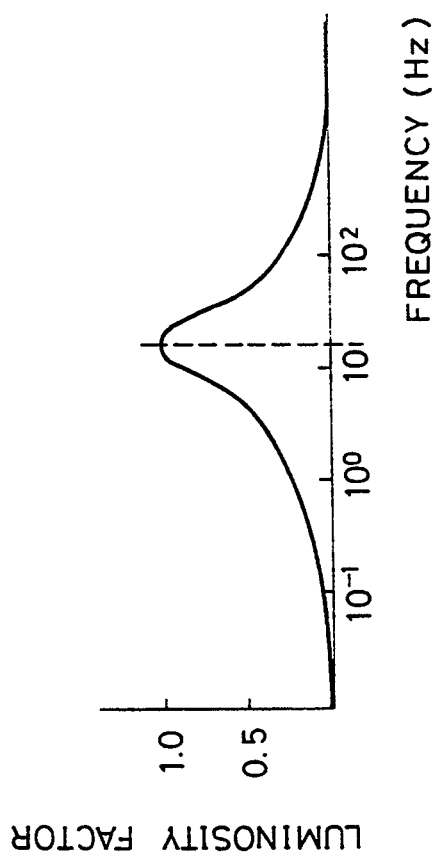
FIG. 5 shows a luminosity factor of an amount of flickering over a frequency range.

The luminosity pass filter 53 is a filter which passes only flickering components and is designed based on the luminosity factor which represents a relation between the amount of flickering and frequency. As seen in FIG. 5, the luminosity factor is maximum at about 20 Hz and decreases at frequencies greater and less than 20 Hz.

Figure 6A:
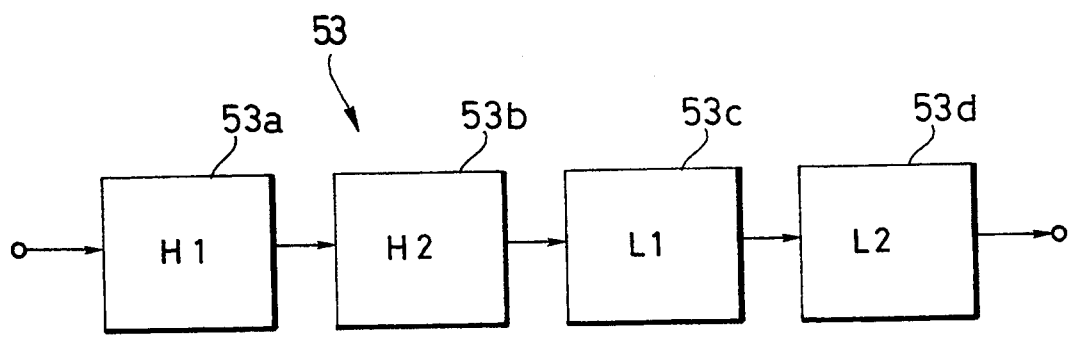
FIG. 6A shows a luminosity pass filter.

The luminosity pass filter is approximately constituted by a serial connection of a second order high-pass filter and a second order low-pass filter, as seen in FIG. 6A. The second order high-pass filter is constituted by a serial connection of first order high-pass filters H1 and H2 as shown in FIG. 6A, and the second order low-pass filter by a serial connection of the first order low-pass filters L1 and L2.

Figure 6B:
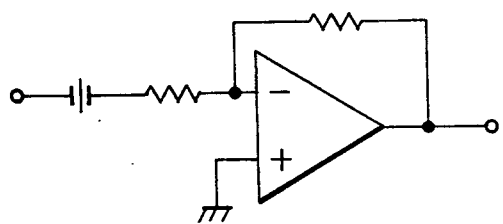
FIG. 6B shows a first order high pass filter.
Figure 6C:
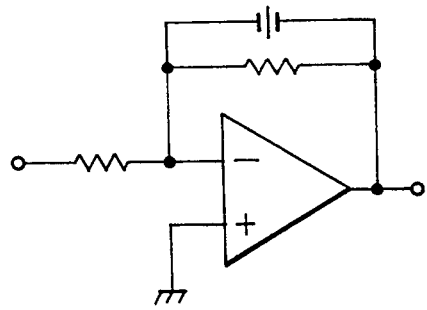
FIG. 6C shows a first order low pass filter.
Figure 6D:
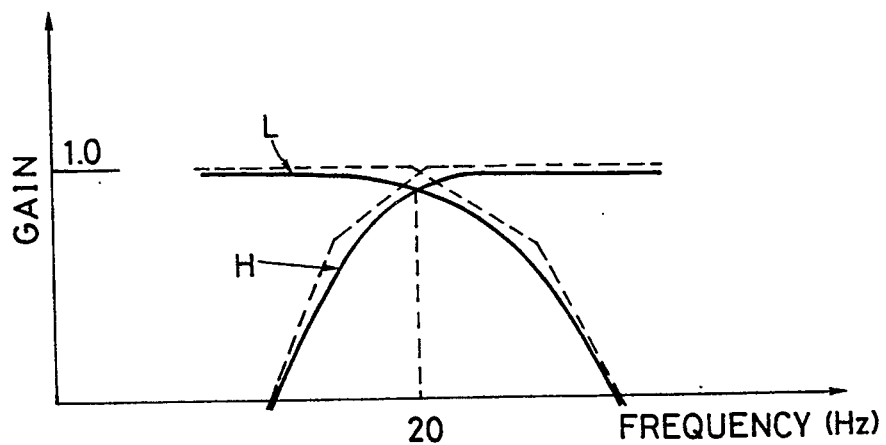
FIG. 6D shows a frequency characteristic of the luminosity pass filter.

Examples of a first order high-pass filter and a first order low-pass filter are shown in FIGS. 6B and 6C, respectively. The characteristic of the filter 53 is shown in FIG. 6D. In the figure, a solid line L indicates a characteristic of a low-pass filter, a solid line H indicates a characteristic of a high-pass filter and a slanted region enclosed by these lines indicates a passband of the filter 53.

Figure 7:
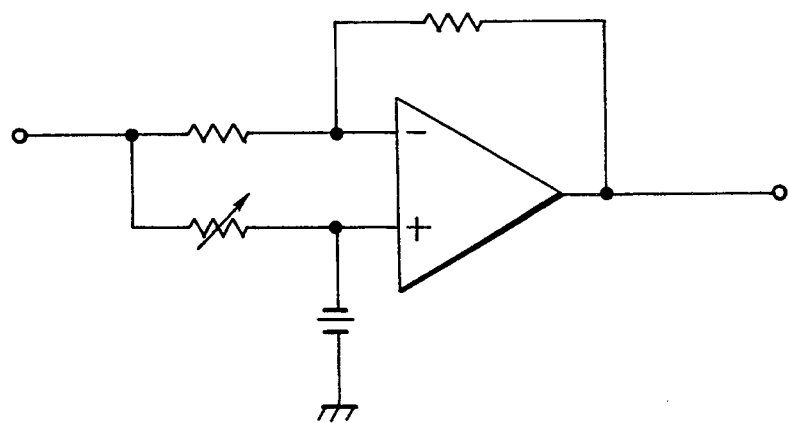
FIG. 7 shows a phase shifter.

The phase shifter 55 compensates for a phase lag caused by the filter 53, which lag is determined by a phase characteristics of the filter 53. The phase shifter 55 which compensates for the lag is constituted as shown in FIG. 7. The lag is adjusted by a variable resistance as shown in FIG. 7.

Figure 8:
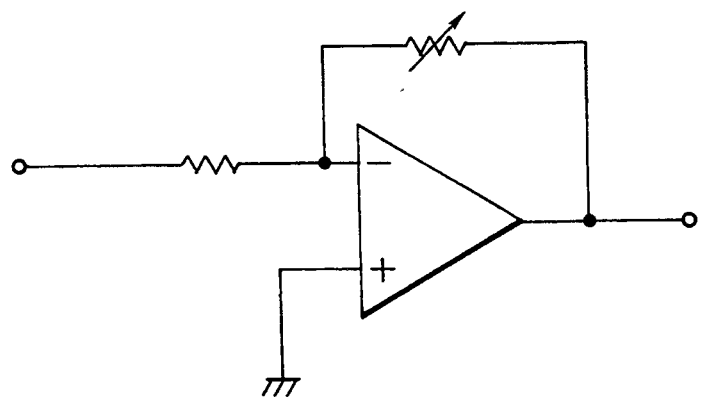
FIG. 8 shows a first gain compensator.

The first gain compensator 57 compensates an amplitude of an output of the second controller in order to balance the output of the second controller second controller of the output of the first controller. FIG. 8 shows an example of the first gain compensator 57.

Figure 9A:
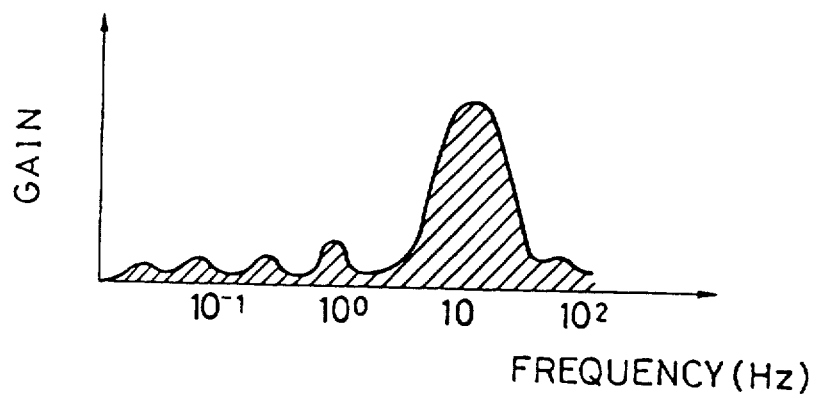
FIG. 9A shows a frequency component of output of a luminosity pass filter.
Figure 9B:
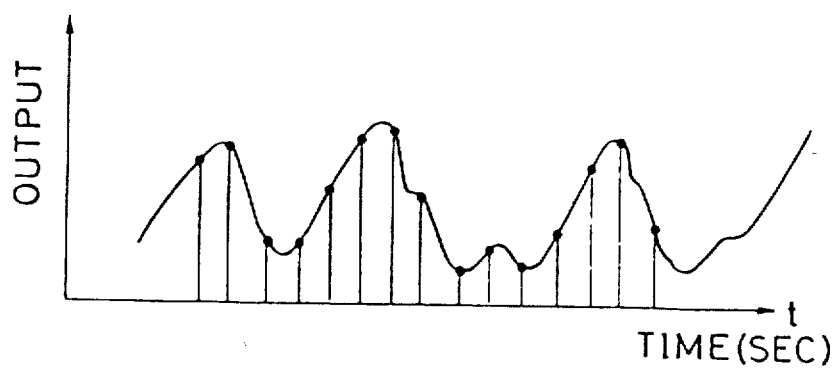
FIG. 9B shows an output wave of a first gain compensator.

FIG. 9A shows an example of the frequency components of outputs of a luminosity pass filter 53. As seen in the figure, waves of frequencies of about 20 Hz are mainly passed through the filter. FIG. 9B shows an example of the output wave of the first gain compensator 57. The output M of the compensator 57 is subtracted from the output M of the first controller 27, so that a switching time of the inverter 17 is slightly changed and ripples of frequencies of about 20 Hz are removed.

In the first embodiment, the second controller is constituted by analog elements, however it can be constituted by digital components or can be realized by use of a digital computer instead.

In the embodiment of the invention, a PWM type inverter is applied practiced with. However, the invention may be applied inverters of other types.

Figure 10:
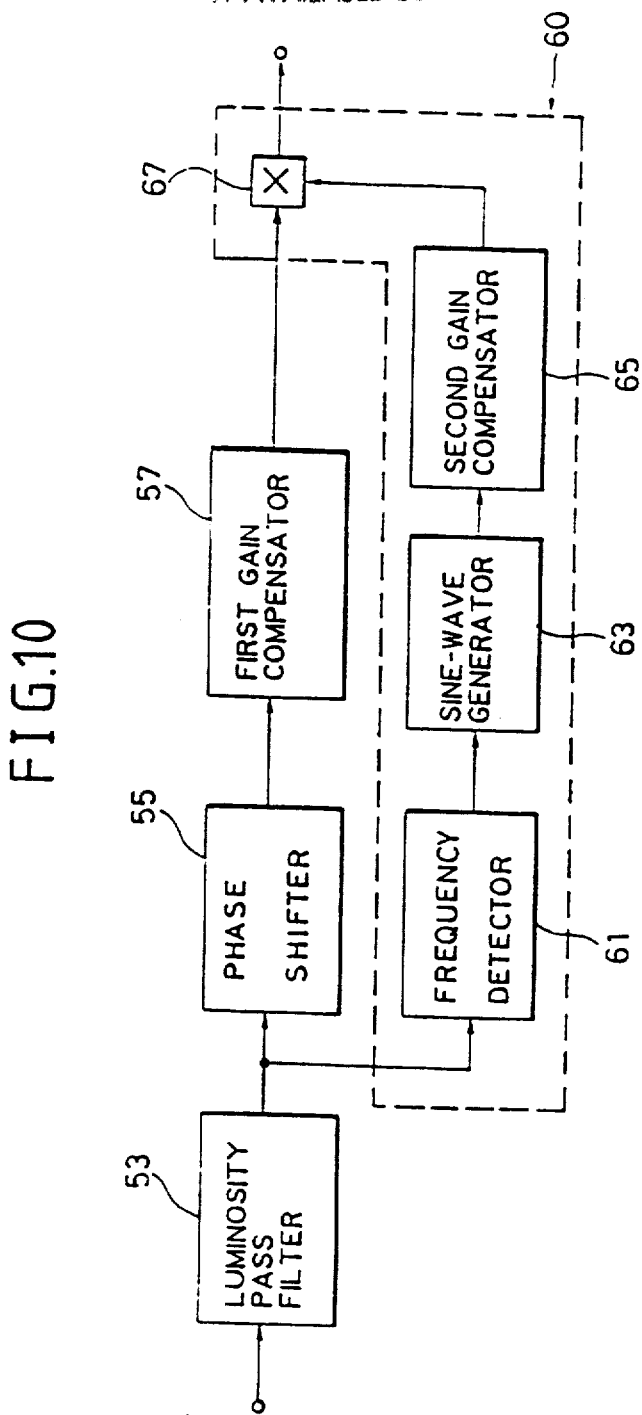
FIG. 10 shows a block diagram of a second controller of a second embodiment.

FIG. 10 shows a block diagram of a second controller system of a second embodiment. This embodiment further comprises a subsidiary control system 60 enclosed by a dotted line, in addition to the second controller of the first embodiment, as seen in the figure. In the first embodiment, flickering components cannot be completely removed when a frequency of a main flickering component of the output $V_o$ differs from a specified frequency of the second controller 51, because the main frequency is predetermined. The subsidiary controller system 60, therefore, is added to the first embodiment in order to decrease such influences when the main frequency differs from the specified one.

The system 60, as shown in FIG. 10, comprises a main frequency detector 61, a sine wave generator 63, a second gain compensator 65 and a multiplier 67. These components can be constituted by use of digital circuits or a digital computer. An embodiment of analog circuits is explained in the following.

Figure 11:
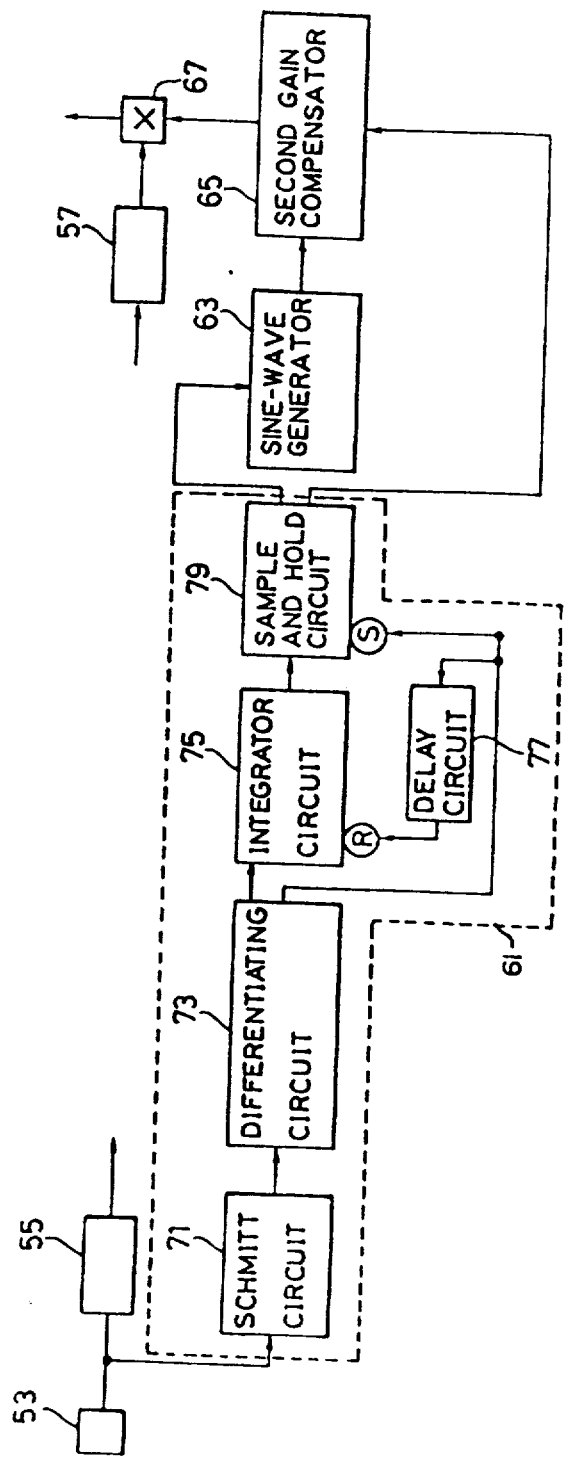
FIG. 11 shows details of the second controller shown in FIG. 10.

FIG. 11 shows a detailed block diagram of the system 60 of FIG. 10. The main frequency detector 61 comprises a schmitt trigger circuit 71, a differentiating circuit 73, an integrator 75, a microtime delay circuit 77, and a sample-and-hold circuit 79. A flickering wave passed through the luminosity pass filter 53 is transformed into a rectangular wave by the schmitt circuit 71. The rectangular wave is differentiated by the differentiating circuit 73. Time between two pulses from the differentiating circuit 73 equals a period T of a main frequency of a flickering component. The period T is proportionally transformed into a voltage $V_H$ by the integrator 75, and is held by the sample-and-hold circuit 79. The delay circuit 77 resets the integrator 75 a short time after the sample-and-hold circuit is set.

Figure 12A:
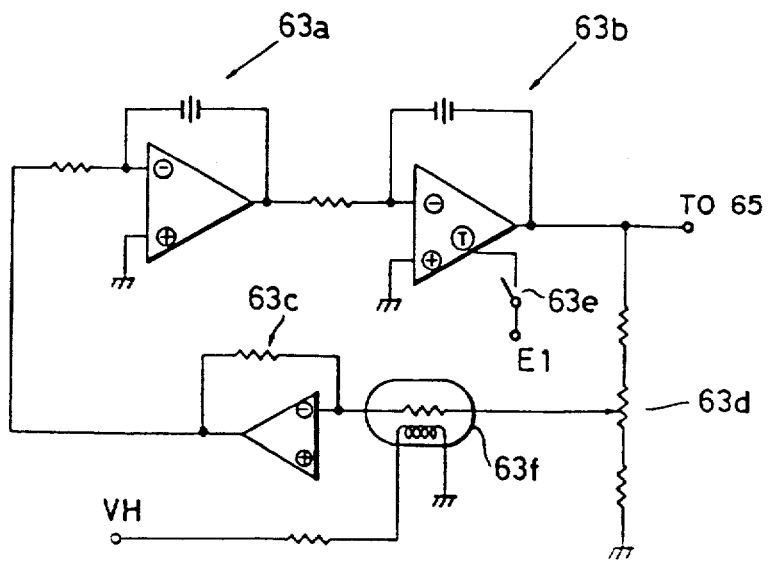
FIG. 12A shows a sine wave generator for sign waves of changing frequency.
Figure 12B:
FIG. 12B shows a characteristic of a photo cell element.

FIG. 12A shows a sine wave generator 63 which is composed of two integrators 63a, 63b and a variable gain amplifier 63c with a variable resistance 63f. The variable resistance 63f is, for example, a photo-cell element and its value is inversely proportional to the square of the input voltage V as shown in FIG. 12B. A frequency of the sine wave generated by the generator 63 is inversely proportional to the period T, and is the same as the main frequency of the flickering component if a variable resistance 63f is properly adjusted. The amplitude of the sine wave is determined by an initial value E1 of the integrator 63b. The phase of the sine wave is zero when a switch 63e is turned on.

Figure 13A:
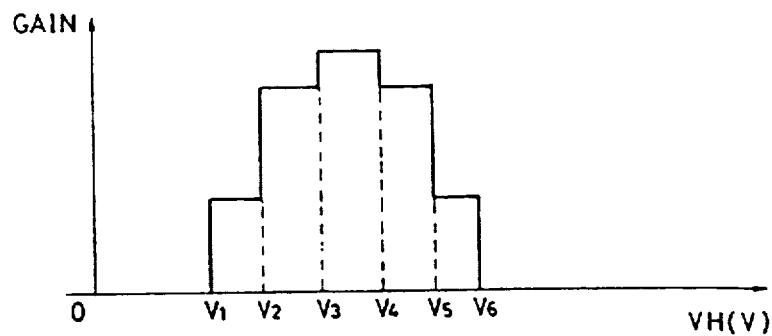
FIG. 13A shows an approximated luminosity factor.

The second gain compensator 65 compensates a main frequency of flickering components by generating a coefficient proportional to the luminosity factor. FIG. 13A shows an approximated factor of the luminosity factor. As seen in the figure, the abscissa is expressed in voltage instead of frequency, because the output of the sample-and-hold circuit 79 is given as a voltage $V_H$.

Figure 13B:
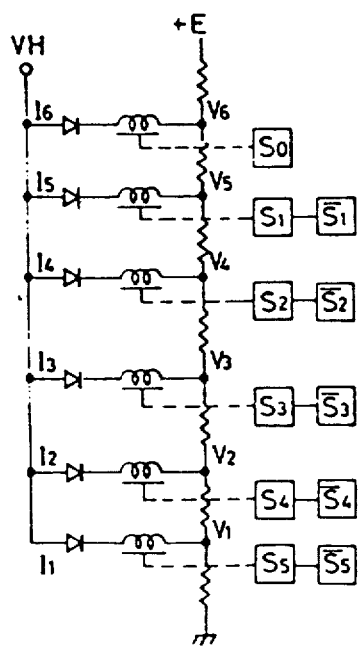
FIG. 13B shows a switching system which depends on voltage VH.
Figure 13C:
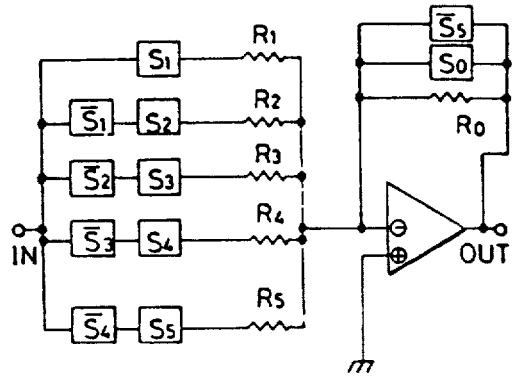
FIG. 13C shows a gain compensator with a changeable gain according to voltage $V_H$.

FIG. 13B is a switch system which depends on the voltage $V_H$. In the figure, a switch Si (i=0, 1,. . .5) is turned on when the current Ii flows, and a switch $\overline{Si}$ (i=1, 2,. . .5) is turned on when the current Ii does not flow. FIG. 13C is a gain compensator with a changeable gain according to the voltage $V_H$. In FIG. 13C, switches S1. . .S5, $\overline{S1}$. . .$\overline{S5}$ are controlled by the switch system shown in FIG. 13B, and only one switch is selected according to the voltage $V_H$. As a gain of the gain compensator is decided by the ratio Ri/R0, the approximate luminosity factor is realized if the resistances R0, R1. . .R5 are properly selected.

The multiplier 67 is a means for multiplying the output of the first gain compensator 57 by the output of the second gain compensator 65, which produces zero output when no flickering components exist.

Figure 14A:
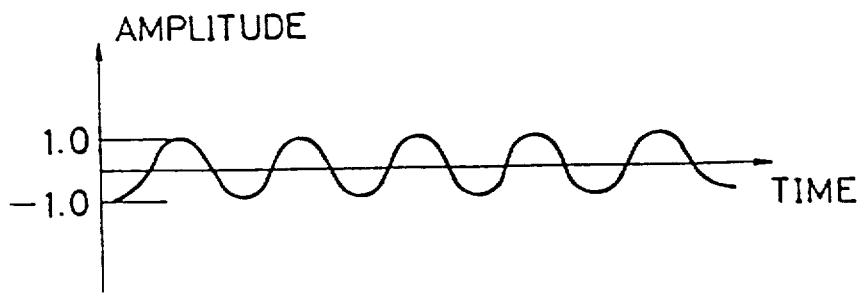
FIG. 14A shows an output wave of a subsidiary control system.
Figure 14B:
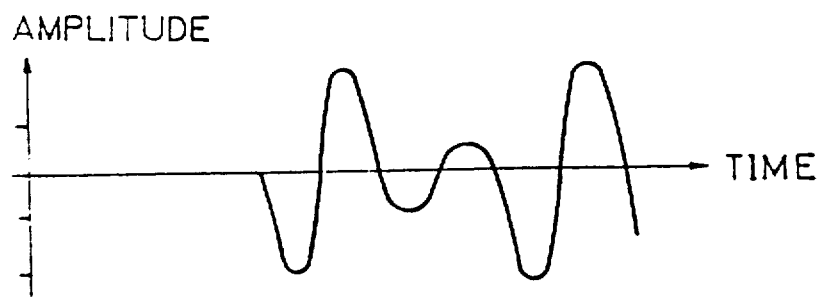
FIG. 14B shows an output wave of a multiplier.

FIG. 14A shows an example of an output wave of the subsidiary controller system 60 when the gain of the compensator second gain 65 is equal to one. FIG. 14B shows an example of an output wave of the multiplier 67.

Figure 15:
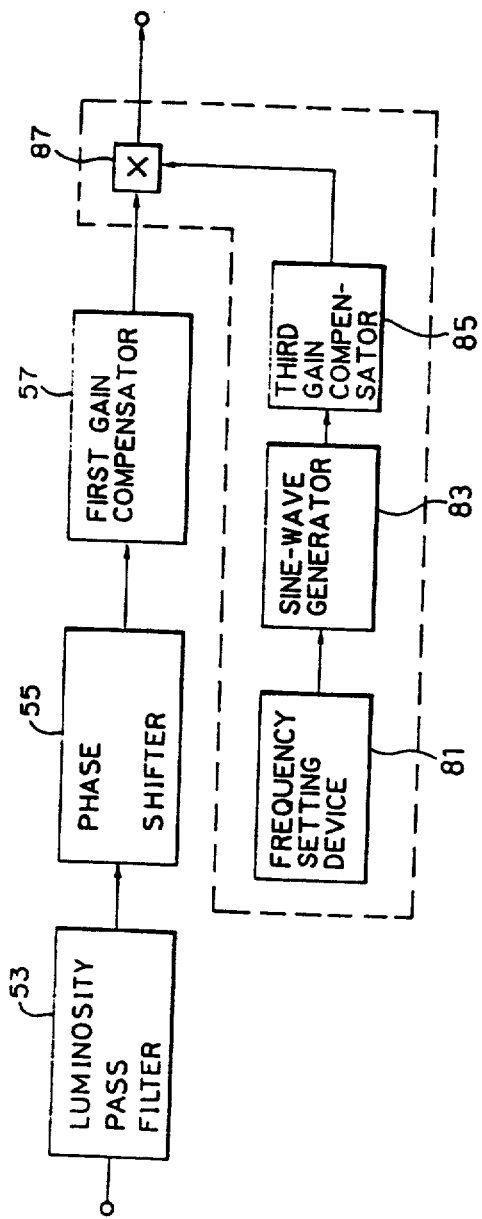
FIG. 15 shows a block diagram of a second controller of a third embodiment of the invention.

FIG. 15 shows a block diagram of a third embodiment of the present invention. The embodiment is used in a case where a frequency of a main flickering component is known. As seen in the figure, this embodiment comprises a luminosity pass filter 53, a phase shifter 55, a first gain compensator 57, a frequency setting device 81, a sine wave generator 83, a third gain compensator 85, and a multiplier 87. The third embodiment differs from the second embodiment in that that the third embodiment uses the frequency setting device 81 instead of the frequency detector 61 of the second embodiment.

In the third embodiment, as the frequency setting device 81 is linked to the sine wave generator 83 and the third gain compensator 85, a sine wave of a corresponding frequency and amplitude is generated and output from the third gain compensator 85 when a frequency is selected by the frequency setting device 81. The sine wave is multiplied by the output of the first gain compensator 57 via multiplier 87 and added to the output of the first controller 27.

Figures 16, 17:
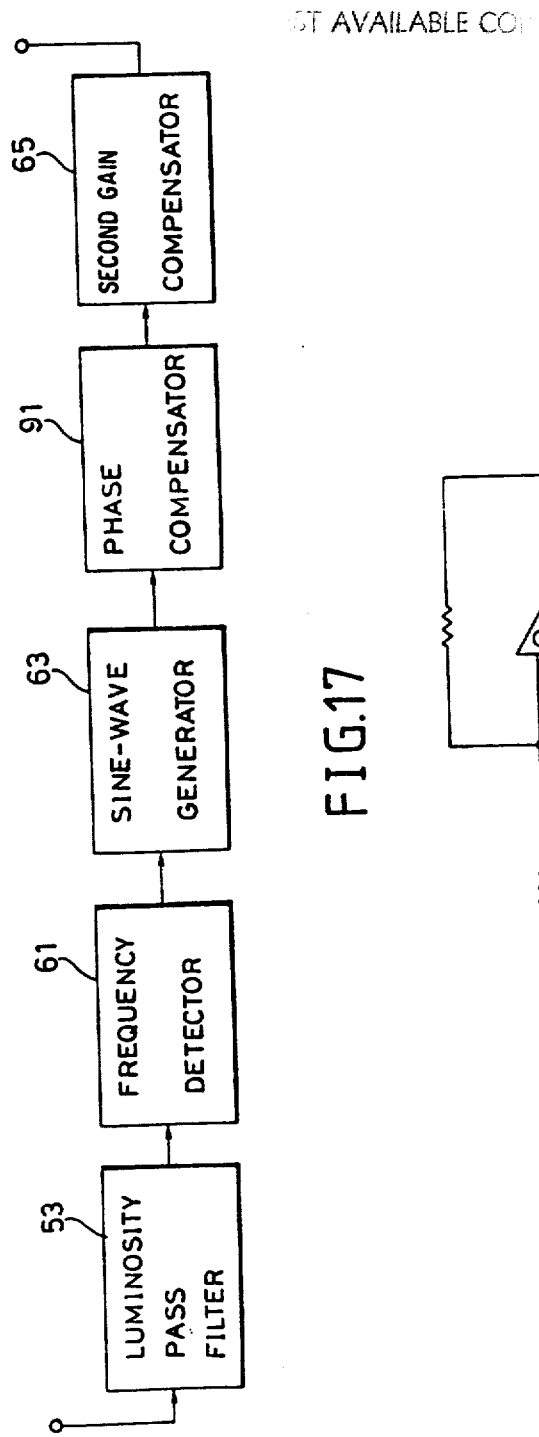
FIG. 16 shows a block diagram of a second controller of a fourth embodiment of the invention.
FIG. 17 shows a phase compensator of the fourth embodiment.

FIG. 16 shows a block diagram of a second controller of a fourth embodiment of the present invention. The second controller of this embodiment comprises a luminosity pass filter 53, a frequency detector 61, a sine wave generator 63, a phase compensator 91, and a second gain compensator 65. All the devices except the phase compensator 91 are the same as the devices mentioned above in the second embodiment of the invention. Thus, they have the same reference numbers as shown in FIG. 10.

FIG. 17 shows the phase compensator 91 of this embodiment. The phase compensator 91 has a switching system 93 which was mentioned above in FIGS. 13B and 13C. If the resistances R1, R2,. . .R5 are properly chosen, a phase lag caused by the luminosity pass filter 53 is approximately compensated by the phase compensator 91. The operation of the device is the same as that of the second embodiment mentioned above, the detailed explanation will thus be omitted.

Various modifications are possible for those skilled in the art upon learning the teachings of the present disclosure, without departing from the scope thereof.

What is claimed is:

1. An AC power supply system comprising:
   an inverter for inverting DC power to AC power;
   a filter for passing components of said AC power having a frequency lower than a cut-off frequency of said filter;
   first detecting means for detecting an amplitude of an output of said filter;
   second detecting means for detecting any deviation of said amplitude from a reference signal and outputting an error signal;
   first control means for controlling said inverter in accordance with said error signal output from said second detecting means; and
   second control means, connected to receive said output of said filter, for detecting and removing flickering components of low frequency from said output of said filter, said second control means comprising flickering components contained in said output of said filter;
   a phase shifter for shifting a phase of said flickering components output from said flickering component passing means, said flickering components having experienced a phase lag as a result of passing through said flickering component passing means; and
   an adder for adding together an output of said second control means and an output of said first control means so as to remove said flickering components from said error signal.

2. An AC power supply system according to claim 1, further comprising:
   third detecting means for detecting a frequency of said flickering components output from said flickering component passing means;
   first sine wave generating means for generating a sine wave having a frequency substantially identical to that of said flickering components; and
   multiplying means for multiplying said output of said second control means by an output of said first sine wave generating means.

3. An AC power supply system according to claim 2, further comprising sine wave compensating means for compensating a gain of said output of said first sine wave generating means.

4. An AC power supply system according to claim 1, further comprising:

frequency setting means for setting a frequency of flickering components to be removed from said error signal;

second sine wave generating means for generating a sine wave having said frequency set by said frequency setting means; and multiplying means for multiplying said output of said second control system by an output of said second sine wave generating means.

5. An AC power supply system comprising:

an inverter for inverting DC power to AC power;

a filter for passing components of said AC power having a frequency lower than a cut off frequency of said filter;

first detecting means for detecting an amplitude of an output of said filter;

second detecting means for detecting any deviation of said amplitude from a reference signal and outputting an error signal;

first control means for controlling said inverter in accordance with said error signal output from said second detecting means;

second control means, connected to receive said output of said filter, for detecting and removing flickering components from said output of said filter, said second control means comprising flickering component passing means for passing only said flickering components contained in said output of said filter;

third detecting means for detecting a frequency of an output of said flickering component passing means;

third sine wave generating means for generating a sine wave having a frequency substantially identical to that detected by said third detecting means;

a phase shifter for shifting a phase of said sine wave generated by said third sine wave generating means, said sine wave having experienced a phase lag as a result of passing through said flickering component passing means; and an adder for adding together an output of said phase shifter and an output of said second detecting means so as to remove said flickering components from said error signal.

* * * * *

UNITED STATES PATENT AND TRADEMARK OFFICE
CERTIFICATE OF CORRECTION

PATENT NO. : 5,347,442
DATED : September 13, 1994
INVENTOR(S) : Takuma HENMI, et al.

It is certified that error appears in the above-indentified patent and that said Letters Patent is hereby corrected as shown below:

On the title page, after the Abstract, "6 Drawing Sheets" should be changed to --14 Drawing Sheets--.

In the formal drawings, please include figures 9A, 9B, 10, 11, 12A, 12B, 13A, 13B, 13C, 14A, 14B, 15, 16, and 17 as found on sheets 7-14 of the enclosed formal drawings.

Signed and Sealed this

Second Day of May, 1995

Attest:

BRUCE LEHMAN

Attesting Officer     Commissioner of Patents and Trademarks